(12) United States Patent
Tracey et al.

(10) Patent No.: US 12,000,174 B2
(45) Date of Patent: Jun. 4, 2024

(54) GALLEY TROLLEY BAY DOOR WITH INCORPORATED TURNBUTTON POSITION INDICATORS

(71) Applicant: B/E Aerospace, Inc., Winston-Salem, NC (US)

(72) Inventors: Christopher L. Tracey, Leighton Buzzard (GB); Gianluigi Malandra, Leighton Buzzard (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 516 days.

(21) Appl. No.: 17/229,993

(22) Filed: Apr. 14, 2021

(65) Prior Publication Data

US 2021/0323653 A1 Oct. 21, 2021

Related U.S. Application Data

(60) Provisional application No. 63/010,457, filed on Apr. 15, 2020.

(51) Int. Cl.
*E05B 41/00* (2006.01)
*B64D 11/04* (2006.01)

(52) U.S. Cl.
CPC ............. *E05B 41/00* (2013.01); *B64D 11/04* (2013.01)

(58) Field of Classification Search
CPC ...... B64D 11/04; B64D 11/0007; E05B 41/00
See application file for complete search history.

(56) References Cited

U.S. PATENT DOCUMENTS 5,074,496 A * 12/1991 Rezag ................... B64D 11/04
244/118.1
6,305,643 B1 * 10/2001 Sankrithi ........... B64D 11/0007
244/118.1

(Continued)

FOREIGN PATENT DOCUMENTS

CN 203826270 U 9/2014
EP 1000854 A2 5/2000

(Continued)

OTHER PUBLICATIONS

Extended Search Report for European Application No. 21168702.5 dated Aug. 6, 2021, 7 pages.

*Primary Examiner* — Philip J Bonzell
*Assistant Examiner* — Cindi M Curry
(74) *Attorney, Agent, or Firm* — Suiter Swantz IP

(57) ABSTRACT

A latch indicator system for a trolley bay is disclosed. The system includes a door that includes a latch indicator window. The system further includes an indicator assembly coupled to the door configured to contact a turnbutton then the door is closed and indicate a latched state or an unlatched state of the turnbutton. The indicator assembly includes a latch signal configured to be visible through the latch indicator window when the turnbutton is in the latched state. The indicator assembly further includes an unlatch signal configured to be visible through the latch indicator window when the turnbutton is in the unlatched state. The system further includes a wedge coupled to the flag assembly configured to contact the turnbutton when the turnbutton is in the unlatched state, where upon contact, the flag assembly is translated so that the unlatch signal is visible through the latch indicator window.

12 Claims, 10 Drawing Sheets

(56) References Cited

U.S. PATENT DOCUMENTS

| | | | |
|---|---|---|---|
| 6,357,806 B1 * | 3/2002 | Saku | B64D 11/0007 |
| | | | 70/432 |
| 7,584,926 B2 | 9/2009 | Harrington et al. | |
| 9,403,603 B2 | 8/2016 | Hozumi et al. | |
| 9,434,474 B2 * | 9/2016 | Hothi | B64D 13/08 |
| 9,463,926 B2 | 10/2016 | Guering | |
| 9,738,387 B2 | 8/2017 | Holtorf et al. | |
| 9,752,352 B2 | 9/2017 | Portegies | |
| 9,821,911 B2 | 11/2017 | Wallbott et al. | |
| 11,242,149 B2 * | 2/2022 | Brownlie | B64D 11/04 |
| 11,359,408 B2 * | 6/2022 | Kim | E05B 41/00 |
| 2011/0016938 A1 | 1/2011 | Chi | |
| 2013/0257065 A1 | 10/2013 | Burd | |
| 2014/0137574 A1 * | 5/2014 | Hothi | B64D 11/04 |
| | | | 62/62 |
| 2016/0258188 A1 * | 9/2016 | Vandewall | E05C 1/10 |
| 2016/0362183 A1 * | 12/2016 | Hothi | F25D 13/02 |
| 2017/0043857 A1 * | 2/2017 | Seibt | B64D 11/02 |
| 2017/0204635 A1 | 7/2017 | Vandewall et al. | |
| 2018/0016013 A1 | 1/2018 | Burd et al. | |
| 2018/0128016 A1 | 5/2018 | Bauer | |
| 2019/0210730 A1 | 7/2019 | Riedel et al. | |
| 2021/0078708 A1 * | 3/2021 | Brownlie | B64D 11/04 |

FOREIGN PATENT DOCUMENTS

| | | |
|---|---|---|
| EP | 2920074 B1 | 1/2019 |
| EP | 3437994 A1 | 2/2019 |
| WO | 2016154728 A1 | 10/2016 |

* cited by examiner

GALLEY TROLLEY BAY DOOR WITH INCORPORATED TURNBUTTON POSITION INDICATORS

PRIORITY

The present application claims the benefit under 35 U.S.C. § 119(e) of U.S. Provisional App. No. 63/010,457 (filed Apr. 15, 2020), which is incorporated herein by reference in its entirety.

BACKGROUND

In aircraft galleys, it is important for carts, trolleys, and other mobile equipment to be secured when not use, as sudden movement by aircraft, whether by acceleration, deceleration or turbulence, could potentially cause uncontrolled movement of the equipment, resulting in physical injury or damage to the aircraft. Galley trolleys are often stored within a trolley stowage system that may include a closet-like space that secures the trolley.

Some trolley stowage systems are capable of storing and securing more than one trolley within one section of a trolley stowage system. For example, two trolleys may be parked two-deep within a section with the trolleys sequentially rolled into position. Extraction mechanisms within the trolley stowage system assist the attendant in removing the trolley furthest in the trolley stowage system, as it would be difficult for an attendant to reach into the trolley stowage system to pullout the parked furthest into the trolley stowage system.

Trolleys stored within the trolley stowage system must be further secured by retainers that are manually rotated into place. For retainers that are deep within the trolley stowage system, the retainers may be rotated through a shaft that links the retainer to a turnbutton that is within the reach of the attendant. Safety rules require that the latching or unlatching of these retainers be sufficiently indicated so that an attendant may easily ascertain that the retainers are secured. However, a simple and economical approach for providing an indicator for trolley stowage system retainers has not been found. Therefore, it is desirable to provide a system that avoids the shortcomings of conventional approaches.

SUMMARY

A system is disclosed. In one or more embodiments, the system includes a door. In some embodiments, the door includes a latch indicator window. In one or more embodiments, the system further includes an indicator assembly coupled to the door configured to contact a turnbutton when the door is closed and indicate a latched state or an unlatched state of the turnbutton. In one or more embodiments, the indicator assembly includes a flag assembly. In one or more embodiments, the indicator assembly further includes a latch signal, configured to be visible through the latch indicator window when the turnbutton is in the latched state. In one or more embodiments, the indicator assembly further includes an unlatch signal, configured to be visible through the latch indicator window when the turnbutton is in the unlatched state. In one or more embodiments, the system further includes a wedge coupled to the flag assembly configured to contact the turnbutton when the turnbutton is in the unlatched state. In one or more embodiments, upon contact the flag assembly is translated so that the unlatch signal is visible through the latch indicator window;

In some embodiments of the system, the system further comprised a spring configured to bias the indicator assembly toward the turnbutton.

In some embodiments of the system, the unlatch signal is further configured to be visible through the latch indicator window upon a malfunction of the indicator assembly.

In some embodiments of the system, the system further comprises a plurality of trolley bays, including at least one extended bay, the extended bay having a front side, a rear side, and at least one side wall, the extended bay configured to removably stow a rear trolley adjacent to the rear side and a front trolley adjacent to the front side.

In some embodiments of the system, the turnbutton in the latched state is coupled to at least one of the plurality the trolley bays, the turnbutton in the latched state being configured to at least one of securing a trolley or engaging a retainer element to secure the trolley.

In some embodiments of the system, the extended bay is configured to stow three or more trolleys.

In some embodiments of the system, the plurality of trolley bays is configured to be implemented in an aircraft.

In some embodiments of the system, the turnbutton is configured as a retaining element.

In some embodiments of the system, the door is configured to couple to more than one indicator assembly.

Another system is disclosed. In one or more embodiments, the system includes a plurality of trolley bays including at least one extended bay. In one or more embodiments, the extended bay includes a front side, a rear side, and at least one side wall. In one or more embodiments, the extended bay is configured to removably stow a rear trolley adjacent to the rear side and a front trolley adjacent to the front side. In one or more embodiments, the system further includes a turnbutton having a latched state and an unlatched state coupled to at least one of the plurality the trolley bays, the turnbutton in the latched state being configured to at least one of securing a trolley or engaging a retainer element to secure the trolley. In one or more embodiments, the system further includes a bay door comprising a latch indicator window. In one or more embodiments, the system further includes an indicator assembly coupled to the bay door configured to contact the turnbutton when the bay door is closed and indicate whether the turnbutton is in the latched stated or unlatched state. In one or more embodiments, the indicator assembly includes a flag assembly comprising. In one or more embodiments, the indicator assembly further includes a latch signal, configured to be visible through the latch indicator window when the turnbutton is in the latched state. In one or more embodiments, the indicator assembly further includes an unlatch signal, configured to be visible through the latch indicator window when the turnbutton is in the unlatched state. In one or more embodiments, the indicator assembly further includes a wedge coupled to the flag assembly configured to contact the turnbutton when the turnbutton is in the unlatched state, wherein upon contact the flag assembly is translated so that the unlatch signal is visible through the latch indicator window.

In some embodiments of the system, the system further comprises a spring configured to bias the indicator assembly toward the turnbutton.

In some embodiments of the system, the embodiments unlatch signal is further configured to be visible through the latch indicator window upon a malfunction of the indicator assembly.

In some embodiments of the system, the plurality of trolley bays is configured to be implemented in an aircraft.

In some embodiments of the system, the extended bay is configured to stow three or more trolleys.

In some embodiments of the system, the bay door is configured to couple to more than one indicator assembly

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
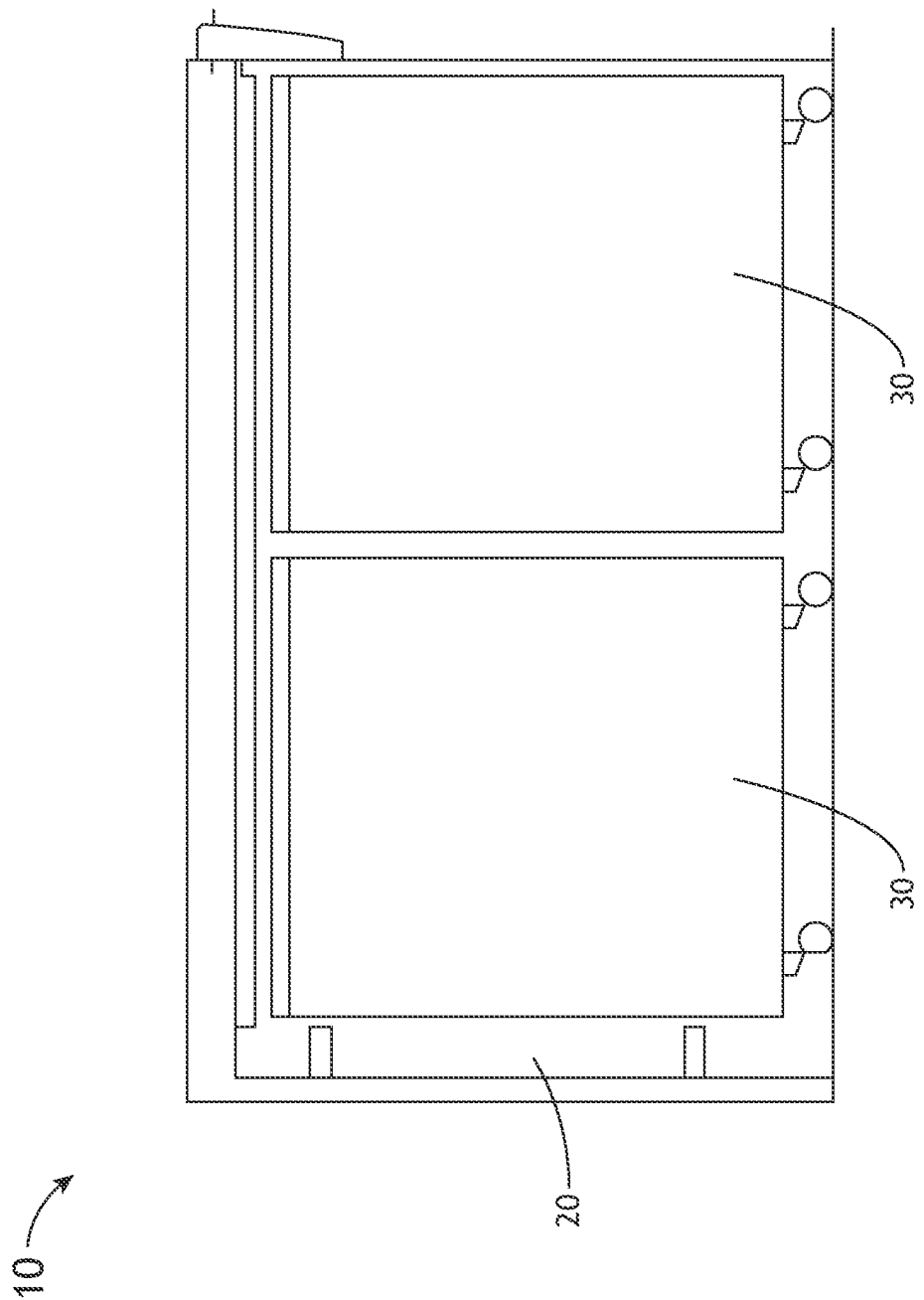
FIG. 1A is a diagram illustrating a side view of a trolley stowage system, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for indicating the latch state of a retainer is disclosed. In some implementations, the latch state of the retainer is determined by the position of a turnbutton. In some implementations, a flagging mechanism, fixed to a door, contacts the turnbutton when the door is closed, actuating the flagging mechanism, the flagging mechanism displaying the latch state of the retainer on the door. In some implementations, the system includes a trolley stowage system with trolleys secured by the retainers.

FIG. 1A is a diagram illustrating a side view of a trolley stowage system 10, in accordance with one or more embodiments of the disclosure. In some embodiments, the trolley stowage system 10 includes one or more bays 20. Each bay has a forward side, a rear side and at least one side wall. The bays 20 are configured to hold one or more trolleys 30 (e.g., an aircraft trolley). For example, the bay may be an extended bay configured to hold two trolleys 30. For instance, the extended bay 20 may be configured to removably stow a rear trolley 30 adjacent to the rear side of the bay 20. In another instance, the extended bay 20 may be configured to removably stow a front trolley 30 adjacent to the front side of the bay 20. The trolley stowage system 10 may be any system that stores trolleys or carts. For example, the trolley stowage system 10 may be a trolley stowage system 10 for an aircraft. In another example, the trolley stowage system 10 may be cart storage system for a cruise ship.

Figure 1B:
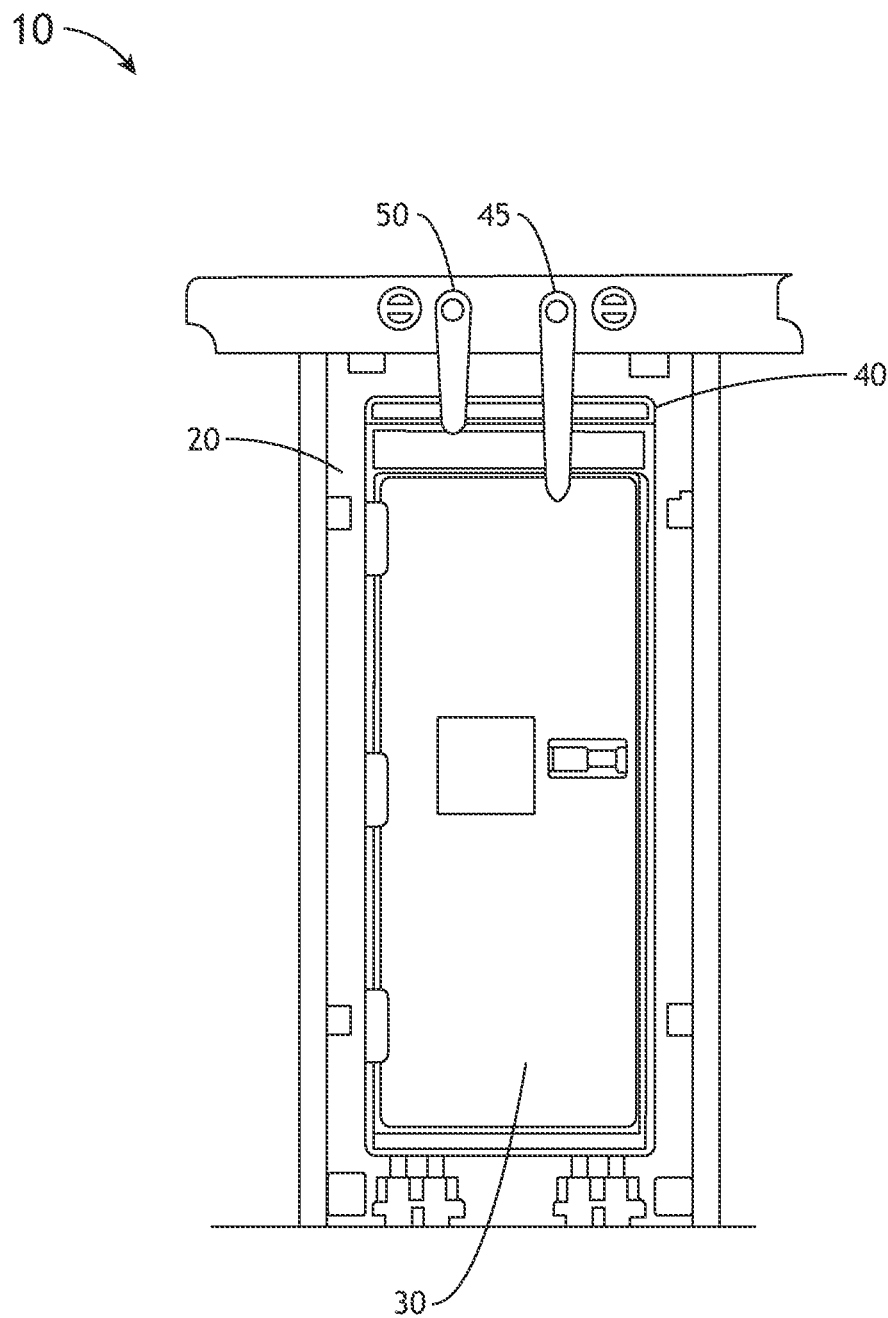
FIG. 1B is a diagram illustrating a front view of a trolley stowage system without a bay door, in accordance with one or more embodiments of the disclosure.

FIG. 1B is a diagram illustrating a front view of a bay 20 of the trolley stowage system 10, in accordance with one or more embodiments of the disclosure. The bay door is removed for clarity. In some embodiments, the trolley stowage system 10 further includes a front retainer 40 (e.g., a retaining element). The front retainer 40 is a lever coupled to the bay entrance via a pin 45, allowing the front retainer 40 to rotate, blocking the front trolley 30 from rolling out of the bay (e.g., securing the front trolley 30).

The trolley stowage system 10 further includes a rear retainer turnbutton 50. The rear retainer turnbutton is mechanically coupled to a rear retainer (not shown) that is responsible for retaining the rear trolley. For example, rotation of the rear retainer turnbutton 50 will rotate the rear retainer into a latched or unlatched state, based on the direction and amount of rotation of the rear retainer turnbutton 50.

Figure 1C:
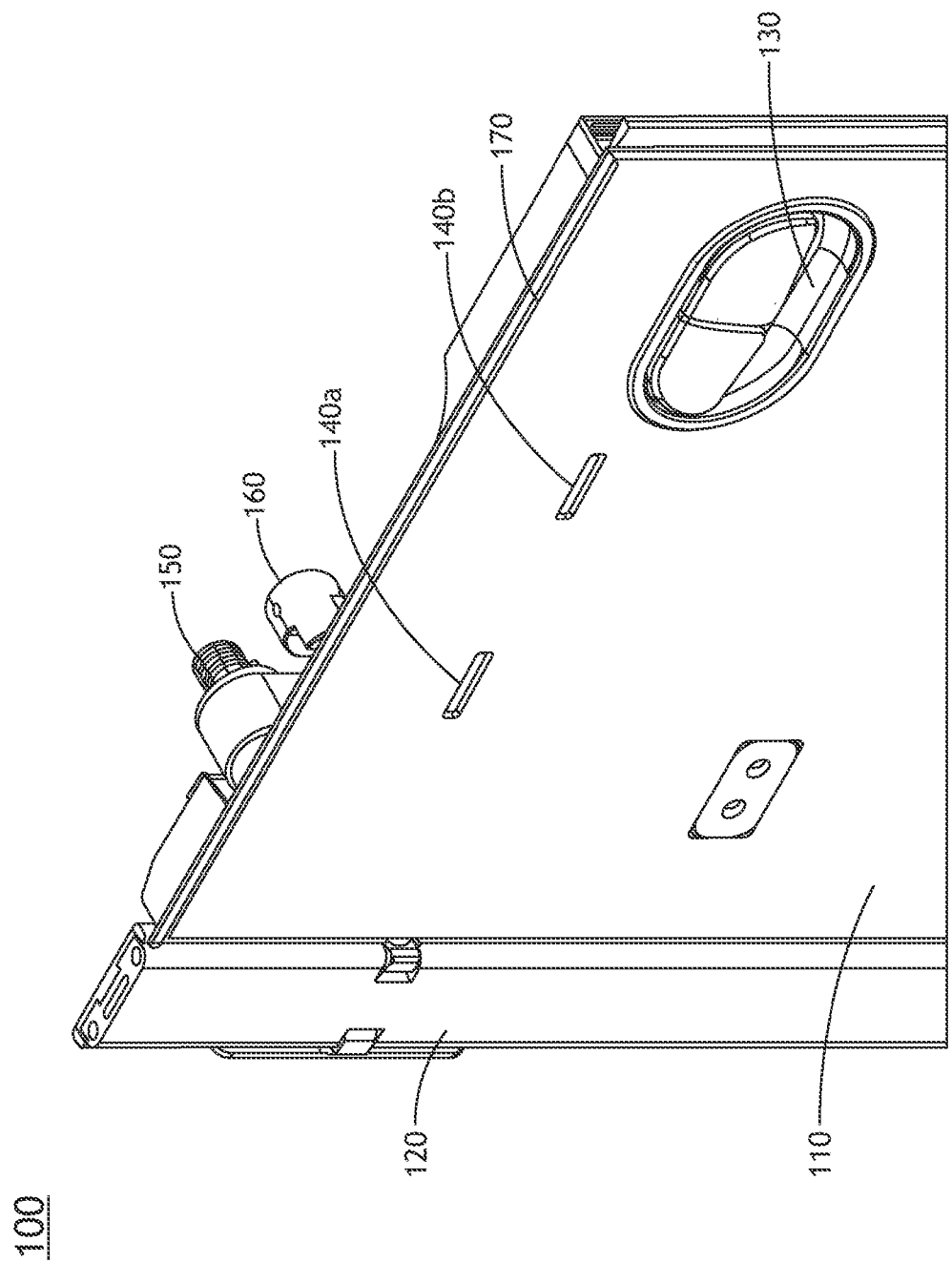
FIG. 1C is a diagram illustrating a perspective view of an example environment of a bay door to a trolley stowage system, in accordance with one or more embodiments of the disclosure.

FIG. 1C is a diagram illustrating a perspective view of an example environment 100 of a closed bay door 110 to the trolley stowage system 10, in accordance with one or more embodiments of the disclosure. The bay door 110 may be any type of bay door 110 used in a trolley stowage system 10 to store a trolley. In some embodiments, the bay door 110 is configured to be attached to a frame section 120 via a hinge, allowing the bay door 110 to be opened into the galley. The bay door may also include a bay door handle 130, allowing an attendant to open the bay door 110.

In some embodiments, the bay door 110 includes one or more latch indicator windows 140. The latch indicator windows 140 are configured to display the latch state of the trolley stowage system 10. The size of the latch indicator window 140 may be any size necessary to alert the attendant of the latch setting of the trolley stowage system 10. The bay door 110 may be configured to include any number of latch indicator window 140 For example, the bay door may have a left latch indicator window 140a and a right latch indicator window 140b. In some embodiments, the bay door 110 is disposed adjacent to the front retainer 40 and/or the rear retainer turnbutton 50 when the bay door is closed.

For the sake of clarity, the trolley stowage system 10 will be described as having a front and a rear section for storing two trolleys. For example, the trolley stowage system 10 will have one trolley 30 in the front section (e.g., the front trolley) and one trolley in the rear section (e.g., the rear trolley). The trolley stowage system 10 may have any number of sections for storing multiple trolleys 30, each with a set of retainers. For example, a trolley stowage system 10 may be configured to store five trolleys 30, each with their own respective set of retainers. Therefore, the description herein should not be interpreted as a limitation of the present disclosure, but merely an illustration.

In some embodiments, the rear retainer turnbutton 50 is connected via a shaft to a rear retainer that retains the rear trolley (shaft and rear retainer not shown). The bay door 110 also includes a cut-out area 170 that creates space for the front retainer 40, the rear retainer turnbutton 50, and other componentry of the trolley stowage system 10.

Figure 2A:
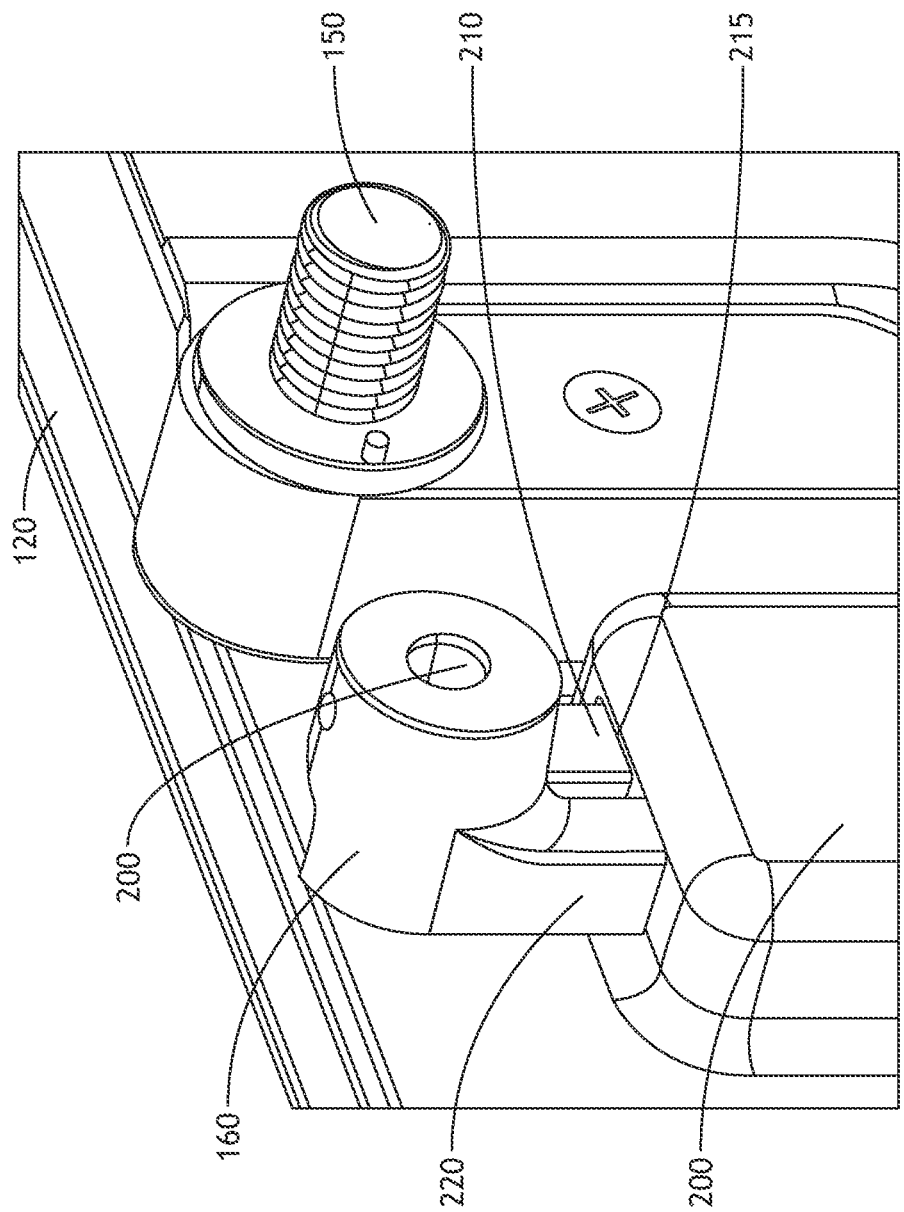
FIG. 2A is a diagram illustrating a perspective view of an interior side of a bay door to a trolley stowage system with a rear retainer turnbutton in a latched state in accordance with one or more embodiments of the disclosure.

FIG. 2A is a diagram illustrating a perspective view of an interior side of the bay door 110 to a trolley stowage system 10 with a rear retainer turnbutton 50 in a latched state, in accordance with one or more embodiments of the disclosure. In some embodiments, an indicator assembly housing 200 is attached to the interior side of the bay door. The indicator assembly housing 200 houses the indicator componentry of the trolley stowage system 10. In some embodiments, a wedge 210 is disposed within an opening 215 in the indicator assembly housing 200 and can translate back and forth within the opening 215 in the indicator assembly housing 200. The wedge is configured to make contact with an arm 220 of the rear retainer turnbutton 50 when the rear retainer turnbutton 50 is in an unlatched state (e.g., as in FIG. 2B). When the rear retainer turnbutton 50 is in the latched state, the arm 220 of the rear retainer turnbutton 50 and the wedge 210 are not in contact (e.g., as in FIG. 2A)

Figure 2B:
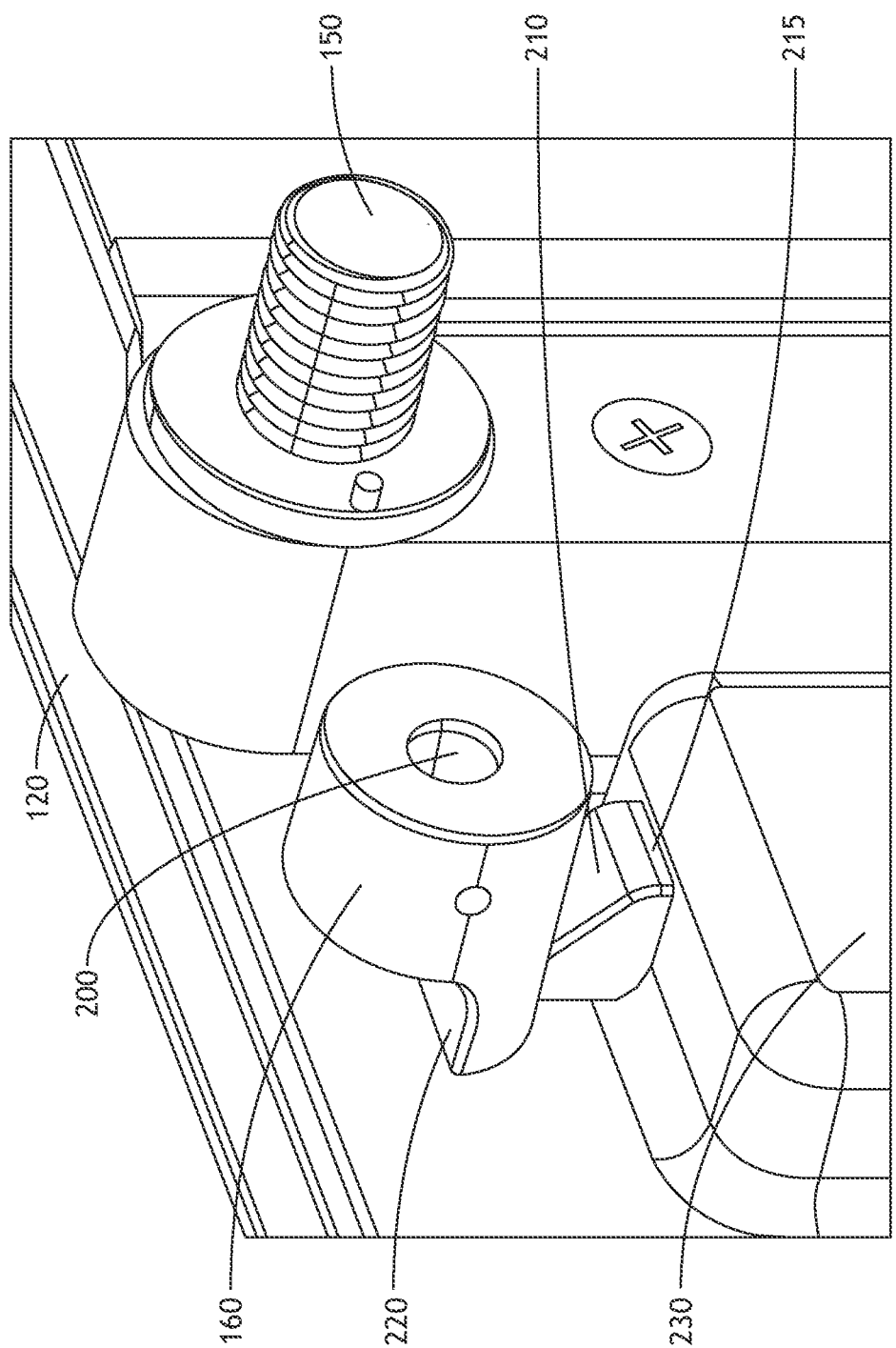
FIG. 2B is a diagram illustrating a perspective view of an interior side of the bay door to a trolley stowage system with a rear retainer turnbutton in unlatched state in accordance with one or more embodiments of the disclosure.

FIG. 2B is a diagram illustrating a perspective view of an interior side of the bay door 110 to a trolley stowage system 10 with a rear retainer turnbutton 50 in an unlatched state, in accordance with one or more embodiments of the disclosure. When the rear retainer turnbutton 50 has been rotated so as to unlatch the rear retainer of the rear trolley, and the bay door 110 is closed, the wedge 210 makes contact with the arm 220 of the rear retainer turnbutton 50, pushing the wedge downward through the opening 215 in the indicator assembly housing 200.

Figure 3A:
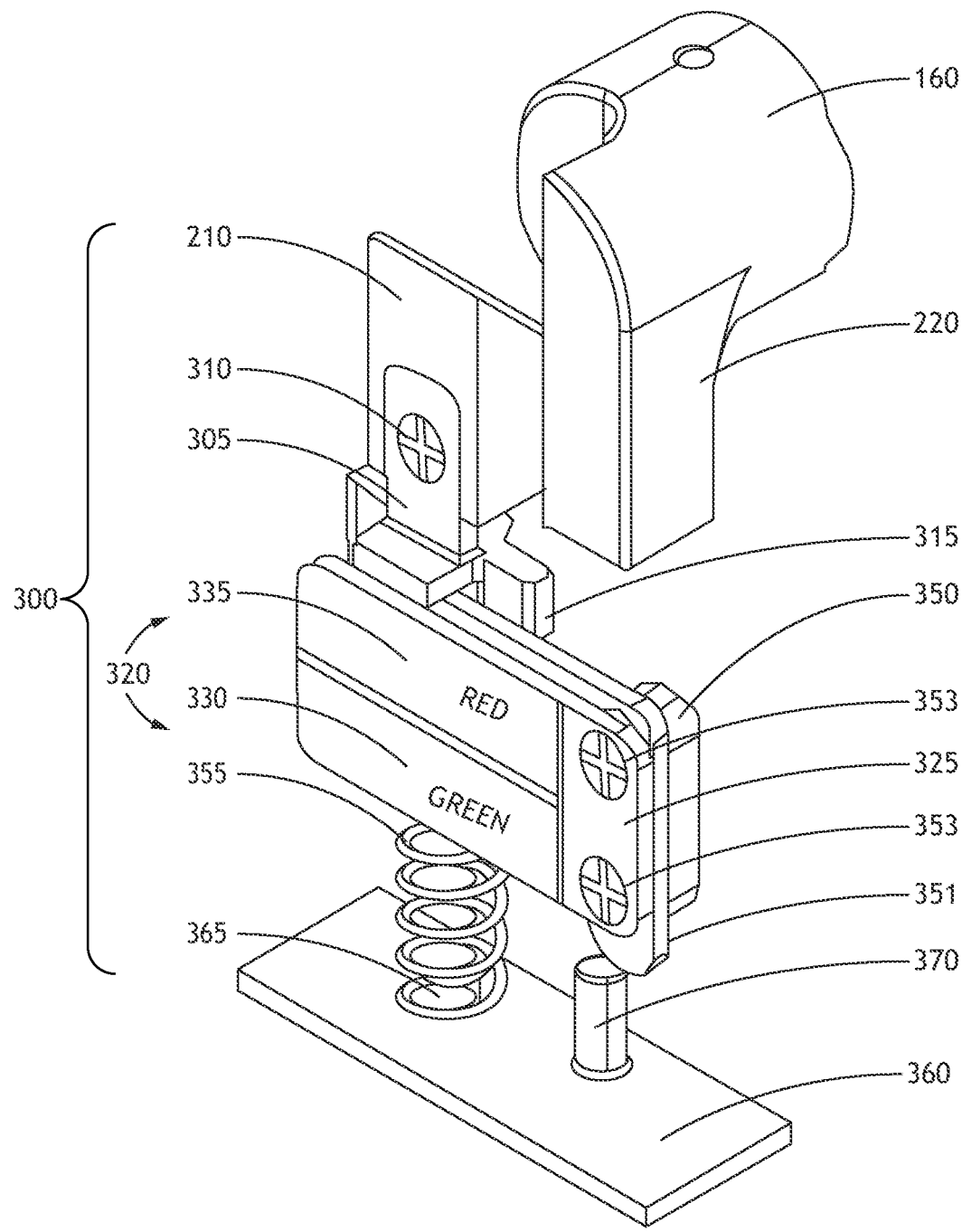
FIG. 3A is a diagram illustrating a perspective view of an indicator assembly that is not engaged with a rear retainer turnbutton, in accordance with one or more embodiments of the disclosure.

FIG. 3A is a diagram illustrating a perspective view of an indicator assembly 300 that is not engaged with the rear retainer turnbutton 50, in accordance with one or more embodiments of the disclosure. The indicator assembly 300 is configured to indicate a latched signal when the rear retainer turnbutton is rotated into a latched state (e.g., not engaging the wedge 210, with a signal visible through one or more latch indicator windows 140. In some embodiments, the indicator assembly 300 includes the wedge 210 and a push blade 305 attached to the wedge 210 via a wedge screw 310. In some embodiments, the push blade 305 is fixed to a push guide 315.

In some embodiments, the indicator assembly 300 includes a flag assembly 320. In some embodiments, the flag assembly 320 includes a front layer 325 that displays an indication signal of the indicator assembly 300. For example, the front layer 325 may include a latch signal 330 (e.g., a green stripe, as indicated by the word "green" in FIGS. 3A-4C). In another example, the front layer 325 may include an unlatch signal 335 (e.g., a red stripe as indicated by the word "red" in FIGS. 3A to 4C). Other types of latch signals 330 and unlatch signals 335 are possible as well as many configurations of the front layer 325. For example, the latch signal 330 and/or unlatch signal 335 may be of any combination of colors. In another example, the latch signal 330 and/or unlatch signal 335) may include words that indicate the latch condition (e.g., "locked and "unlocked", respectively). Therefore, the description herein should not be interpreted as a limitation of the present disclosure, but merely an illustration.

In some embodiments, the flag assembly 320 includes a base layer 350 that increases the target area for the flag assembly 320 to interact with the push blade 305 and/or increases the stability of the flag assembly 320. In some embodiments, the flag assembly 320 includes one or more intermediate layers 351. In some embodiments, the front layer, the intermediate layer 351, and the base layer 350 are coupled together via flag assembly screws 353. In some embodiments, the flag assembly screws 353 may be loosened and/or tightened to adjust the flag assembly 320. For example, the assembly screws 353 along with the front layer 325 and intermediate layer 351 may be adjusted against the stop layer 340 to ensure proper alignment of the latch signal 330 and the unlatch signal 335 against the latch indicator window 140.

In some embodiments, the indicator assembly 300 includes a spring 355. The spring 355 provides resistance to any downward force applied to the wedge 210 (i.e., the spring is configured to bias the indicator assembly toward the turnbutton). The spring provides a compression force between the flag assembly 320 and a base 360 (e.g., a static structure within the indicator assembly 300). In some embodiments, the spring 355 is held onto a position upon the base via a protrusion 365. In some embodiments, the indicator assembly 300 further includes a bolt sleeve 370 configured to accept an attachment bolt for attaching the indicator assembly 300 to either the indicator assembly housing 200 or the bay door 110.

Figure 3B:
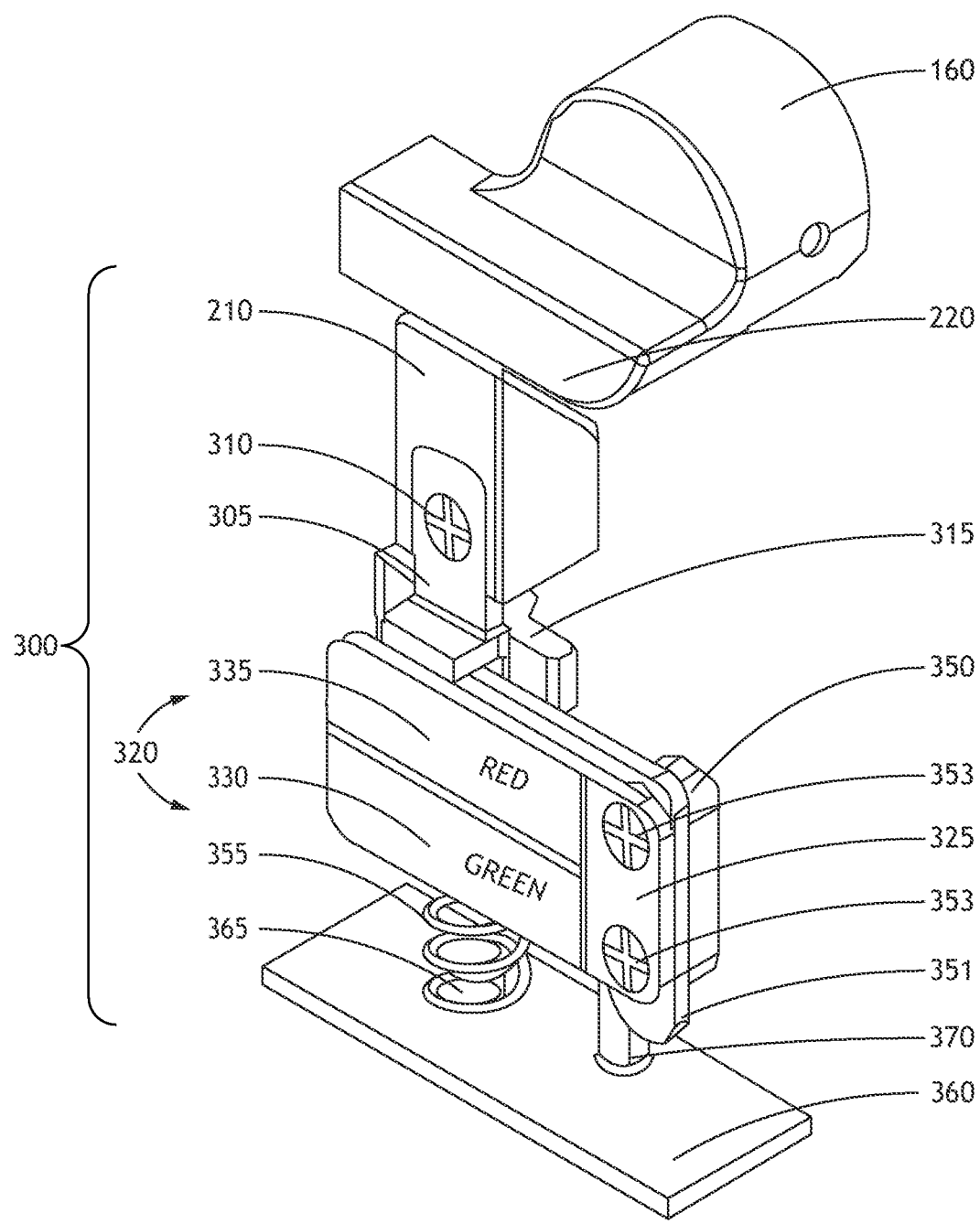
FIG. 3B is a diagram illustrating a perspective view of an indicator assembly that is engaged with a rear retainer turnbutton, in accordance with one or more embodiments of the disclosure.

FIG. 3B is a diagram illustrating a perspective view of an indicator assembly 300 that is engaged with the rear retainer turnbutton 50, in accordance with one or more embodiments of the disclosure. Turning of the rear retainer turnbutton 50 into the unlatched position positions the arm 220 of the rear retainer turnbutton 50 into contact with the wedge 210 once the bay door 110 is closed. The contact of the arm 220 of the rear retainer turnbutton 50 with the wedge drives the indicator assembly 300 downward (e.g., translating the indicator assembly 300). The movement of the indicator assembly changes the portion of the flag assembly 320 that is visible within the latch indicator window 140 (e.g., alternating between the latch signal 330 and the unlatch signal 335). The spring 355 keeps the indicator assembly 300 elevated when the arm 220 of the rear retainer turnbutton 50 is not in contact with the wedge 210 and provides resistance to the force of the arm 210 of the rear retainer turnbutton 50 when in contact with the wedge 210.

It should be understood that the indicator assemblies 300 shown in the disclosure are configured to mechanically couple with rear retainer turnbutton 50, which are coupled to rear retainers. However, the front retainers 40 or a turnbutton coupled to the front retainer 40 may also be coupled to the indicator assembly 300. Therefore, the description herein should not be interpreted as a limitation of the present disclosure, but merely an illustration.

It should also be known that each trolley 30 may stabilized by one, two, or more retainers or retainer turnbuttons with each retainer or retainer turnbutton coupled to an indicator assembly 300. Also, one or more retainers or retainer turnbutton may not be coupled to an indicator assembly 300. Therefore, the description herein should not be interpreted as a limitation of the present disclosure, but merely an illustration.

Figure 4A:
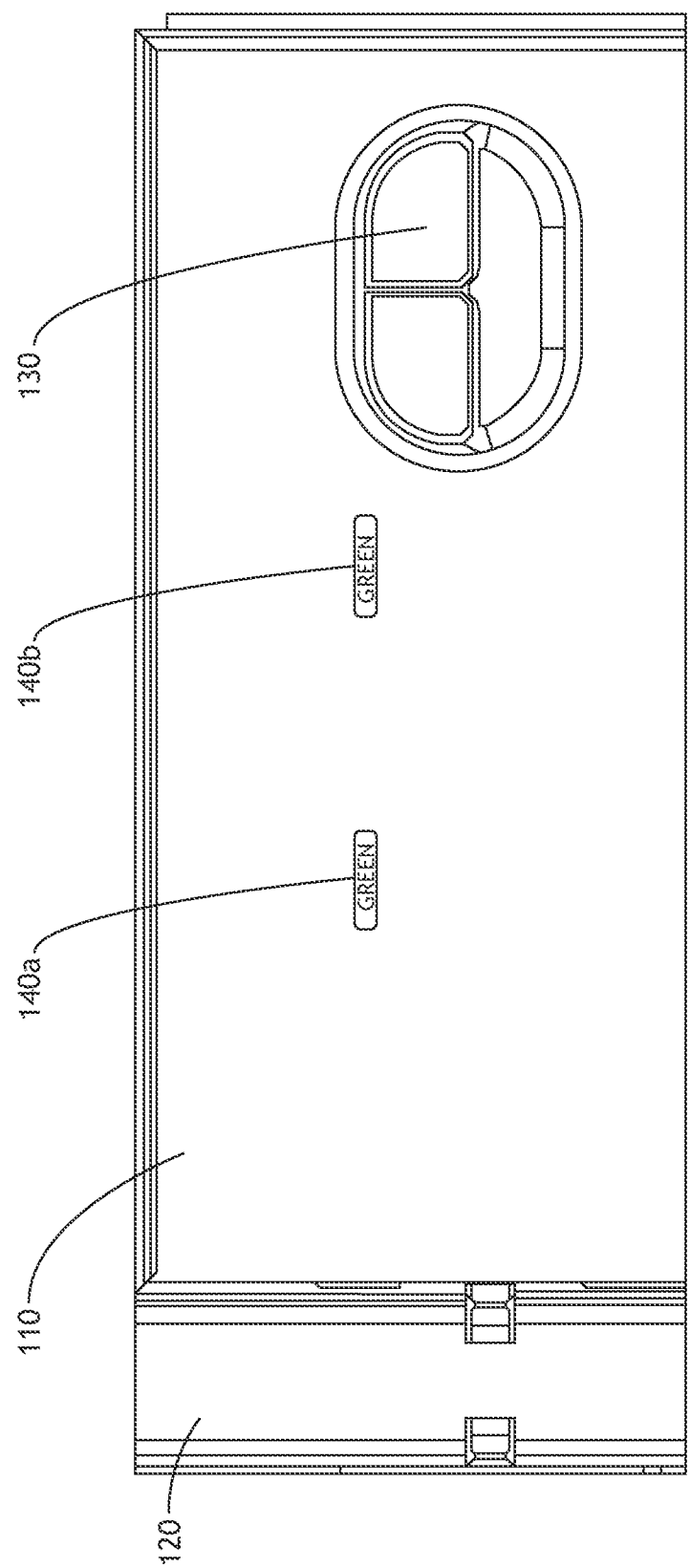
FIG. 4A is a diagram illustrating a front view of an exterior side of a bay door to a trolley stowage system with both latch indicator windows indicating latched retainers, in accordance with one or more embodiments of the disclosure.
Figure 4B:
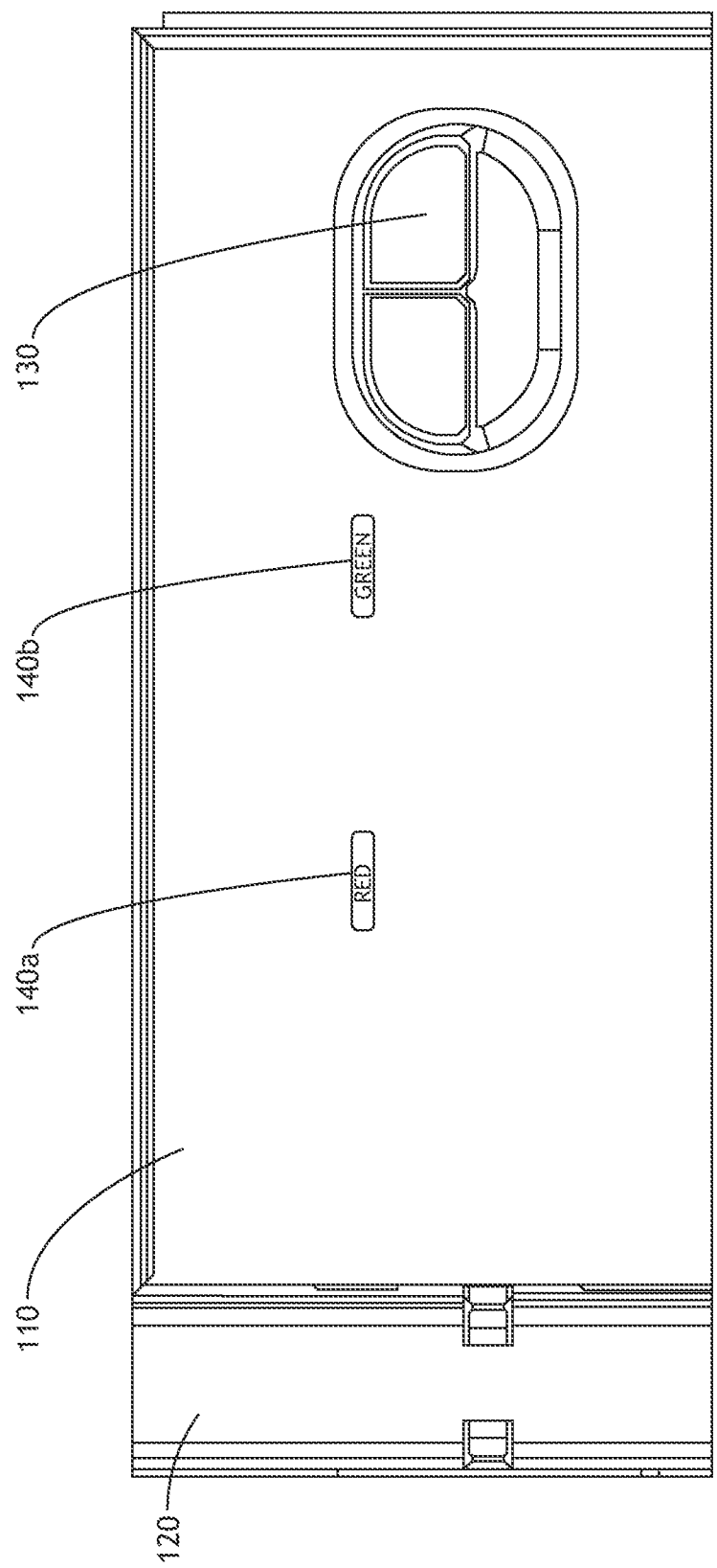
FIG. 4B is a diagram illustrating a front view of an exterior side of a bay door to a trolley stowage system with only one latch indicator window indicating a latched retainer, in accordance with one or more embodiments of the disclosure.
Figure 4C:
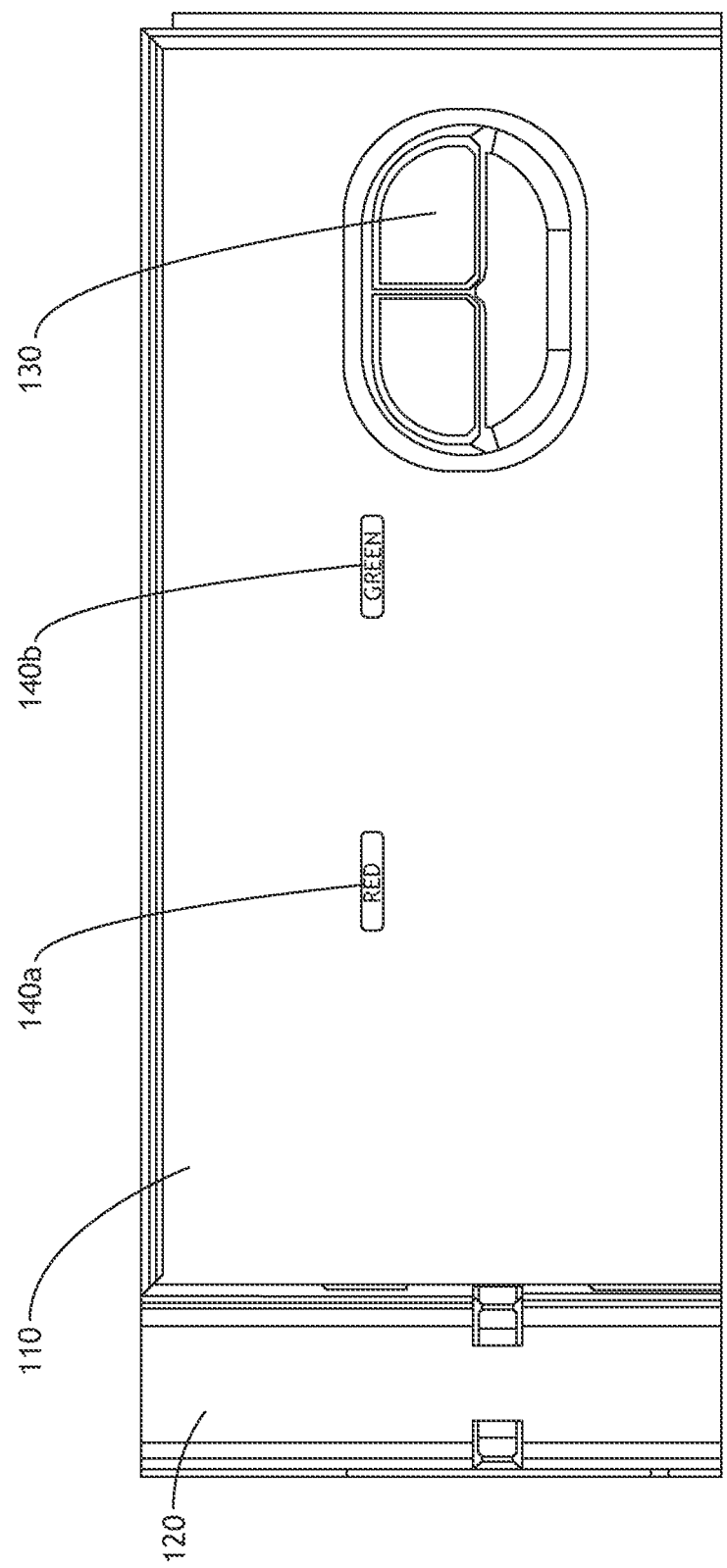
FIG. 4C is a diagram illustrating a front view of an exterior side of a bay door to a trolley stowage system with both latch indicator windows indicating unlatched retainers, in accordance with one or more embodiments of the disclosure.

FIG. 4A-C are diagrams illustrating a front view of an exterior side of the bay door 110 to the trolley stowage system 10, in accordance with one or more embodiments of the disclosure. The bay door 110 includes two latch indicator windows 140 (e.g., the right latch indicator window 140a and the left latch indicator window 140b) that indicate the latch state from separate indicator assemblies 300. In some embodiments, two latch indicator windows 140a, 140b indicate the latch state from two separate retainers of the same trolley 30 (e.g., the rear trolley). In some embodiments the two latch indicator windows 140a, 140b indicate the latch state from two separate retainers from different trolleys 30 (e.g., one from the front trolley, and one from the rear trolley).

In FIG. 4A, both latch indicator windows 140a, 140b indicate that both retainers are in the latched state (e.g., displaying the color green). The latch indicator window 140 displaying the latched state indicates that upon closing the bay door, the arm 220 of the rear retainer turnbutton 50 has not engaged the flag assembly 320 (i.e., compression from the spring 355 keeps the green latch signal 330 displayed in the latch indicator windows 140a, 140b) It should be noted that when the bay door is not closed, the spring 355 pushes up the flag assembly 320 so that the latched signal (e.g., the color green) is displayed in the latch indicator windows 140a, 140b. If the spring were to break, or the indicator assembly otherwise malfunction, the flag assembly 320 would not be raised, thereby giving a constant unlatched signal (e.g., the color red). Therefore, a constant unlatch signal 335 regardless of the position of the rear retainer turnbutton 50 would then indicate that the indicator assembly 300 is broken.

In FIG. 4B, the right latch indicator window 140b indicates that the retainer associated with the right latch indicator window 140b is latched. However, the left latch indicator window 140a indicates that the retainer associated with the left latch indicator window 140b is unlatched (e.g., the arm 220 of the rear retainer turnbutton 50 pushing down on the wedge 210 of the indicator assembly 300 so that the unlatch signal 335 (e.g., the color red) is displayed in the left latch indicator window 140a). In FIG. 4C, both latch indicator windows 140a, 140b indicate that both retainers are in the unlatched state (e.g., displaying the color red).

It should be understood that a retainer (e.g., a front retainer 40 or a rear retainer) may be coupled to the indicator assembly 300 (i.e., the retainer taking on the role of a rear retainer turnbutton 50). It should also be known that a rear retainer turnbutton 50 may be coupled act as a front retainer 40 (i.e., the rear retainer turnbutton 50 also securing a front trolley in the bay. Therefore, the description above should not be interpreted as a limitation of the present disclosure, but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
 a door comprising a front latch indicator window and a rear latch indicator window;
 a front indicator assembly and a rear indicator assembly coupled to the door configured to contact a respective front turnbutton or a rear turnbutton when the door is closed and indicate a latched state or an unlatched state of the respectively front turnbutton or rear turnbutton, the front indicator assembly and a rear indicator assembly each comprising:
 a flag assembly comprising:
 a latch signal, configured to be visible through the latch indicator window when the respective front turnbutton or rear turnbutton is in the latched state; and
 an unlatch signal, configured to be visible through the latch indicator window when the respective front turnbutton or rear turnbutton is in the unlatched state; and
 a wedge coupled to the flag assembly configured to contact the respective front turnbutton or rear turnbutton when the respective front turnbutton or rear turnbutton is in the unlatched state, wherein upon contact the flag assembly is translated so that the unlatch signal is visible through the respective front latch indicator window or rear latch indicator window, wherein the respective front turnbutton and rear turnbutton are configured to at least one of securing a respective front trolley and rear trolley or engaging a respective front retainer element or rear retainer element to secure the front trolley and rear trolley.

2. The system of claim 1, further comprising a spring configured to bias the indicator assembly toward the front turnbutton or rear turnbutton.

3. The system of claim 1, wherein the unlatch signal is further configured to be visible through the respective front latch indicator window or the rear latch indicator window upon a malfunction of the indicator assembly.

4. The system of claim 1, further comprising an extended bay, the extended bay having a front side, a rear side, and at least one side wall, the extended bay configured to removably stow the rear trolley adjacent to the rear side and the front trolley adjacent to the front side.

5. The system of claim 1, wherein the extended bay is configured to stow three or more trolleys.

6. The system of claim 4, wherein the extended trolley bay is configured to be implemented in an aircraft.

7. The system of claim 1, wherein the front turnbutton or the rear turnbutton is configured as a retaining element.

8. A system comprising:
  an extended bay, the extended bay having a front side, a rear side, and at least one side wall, the extended bay configured to removably stow a rear trolley adjacent to the rear side and a front trolley adjacent to the front side;
  a front turnbutton having a latched state and an unlatched state coupled to the extended trolley bay, the front turnbutton in the latched state being configured to at least one of securing a front trolley or engaging a front retainer element to secure the front trolley;
  a rear turnbutton having a latched state and an unlatched state coupled to the extended trolly bay, the rear turnbutton in the latched state being configured to at least one of securing a rear trolley or engaging a rear retainer element to secure the rear trolley;
  a bay door comprising a front latch indicator window and a rear latch indicator window; and
  a front indicator assembly and a rear indicator assembly coupled to the bay door configured to contact the front turnbutton, and the rear turnbutton, respectively, when the bay door is closed and indicate whether the front turnbutton or the rear turnbutton, respectively, is in the latched stated or unlatched state, the front indicator assembly and the rear indicator assembly each comprising:
    a flag assembly comprising:
      a latch signal, configured to be visible through the latch indicator window when the respective front turnbutton or rear turnbutton is in the latched state; and
      an unlatch signal, configured to be visible through the latch indicator window when the respective front turnbutton or rear turnbutton is in the unlatched state; and
    a wedge coupled to the flag assembly configured to contact the turnbutton when the turnbutton is in the unlatched state, wherein upon contact the flag assembly is translated so that the unlatch signal is visible through the latch indicator window.

9. The system of claim 8, further comprising a spring configured to bias the front indicator assembly toward the front turnbutton.

10. The system of claim 8, wherein the unlatch signal is further configured to be visible through the front latch indicator window upon a malfunction of the front indicator assembly.

11. The system of claim 8, wherein the extended bay is configured to be implemented in an aircraft.

12. The system of claim 8, wherein the extended bay is configured to stow three or more trolleys.

* * * * *